United States Patent [19]

Dieckmann et al.

[11] Patent Number: 4,596,403
[45] Date of Patent: Jun. 24, 1986

[54] MOTOR CAR HEAD RESTRAINT HAVING AT LEAST ONE BEARING ARM

[75] Inventors: Dieter Dieckmann; Klaus Matthias, both of Sindelfingen, Fed. Rep. of Germany

[73] Assignee: Daimler-Benz AG, Fed. Rep. of Germany

[21] Appl. No.: 649,207

[22] Filed: Sep. 10, 1984

[30] Foreign Application Priority Data

Sep. 10, 1983 [DE] Fed. Rep. of Germany ....... 3332728

[51] Int. Cl.$^4$ ............................................. B60R 21/04
[52] U.S. Cl. ..................................... 280/751; 297/408
[58] Field of Search ............... 280/751; 297/403, 408, 297/409; 296/63; 292/216, DIG. 37

[56] References Cited

U.S. PATENT DOCUMENTS

| 4,073,170 | 2/1978 | Miyabayashi et al. | 292/DIG. 37 |
| 4,322,111 | 3/1982 | Barley et al. | 297/408 |
| 4,511,180 | 4/1985 | Klaus | 297/408 |

FOREIGN PATENT DOCUMENTS 3131597 2/1983 Fed. Rep. of Germany ...... 297/408

Primary Examiner—John J. Love
Assistant Examiner—Ross Weaver
Attorney, Agent, or Firm—Craig & Burns

[57] ABSTRACT

A head restraint for a vehicle, which is supported by at least one bearing arm on a protrusion, which is arranged between the backrest and a hollow in the rear window shelf with a downward extension in the transverse direction of the vehicle, the hollow serving to receive the head restraint in its stowage position, a bracket is fixed on the underside of the protrusion for the absorption of high forces and to provide protected and elegant accommodation, a web-like middle region of which bracket receives a catch and the shaft of a pawl which interacts with the catch. The pawl is releasable via an actuating device, and the shaft serves as a bearing for at least one of the two bearing elements, connected to each other by means of a rod, for the bearing arms, the rod engaging and locking in the catch when the head restraint is transferred into the position for use.

5 Claims, 4 Drawing Figures

MOTOR CAR HEAD RESTRAINT HAVING AT LEAST ONE BEARING ARM

The invention relates to a head restraint having at least one bearing arm in a motor car, which restraint is transferable, together with the bearing arms, from an in-use position into a stowage position in which the head restraint is received by a hollow in the rear window shelf, the bearing arms being mounted on the body side between the backrest and the hollow on a protrusion with a downward extension in the transverse direction of the vehicle.

A head restraint arranged in such a way is known from German Offenlegungsschrift No. 3,020,558, the bearing arms being mounted on the rear window shelf in the direct vicinity of the backrest. This clearly visible bearing, exposed to external effects, makes the appearance of the vehicle unsightly and hinders the introduction of forces occurring in the event of a head impact.

It is an object to provide an improved head restraint for motor vehicles.

A further object of the invention is to provide a space saving and, at the same time, easy to handle bearing, which is accommodated in a covered manner and is thus protected, and via which the high supporting forces can be introduced.

It is another object of the invention to produce a head restraint wherein from the underside of a protrusion there projects a bracket, the web-like middle region of which receives a catch and the shaft of a pawl which interacts with the catch and is releasable via an actuating device, and in that the shaft serves as a bearing for at least one of two bearing elements, connected to one another by means of a rod, for the bearing arms, and a rod engages and locks in a catch when the head restraint is transferred into the position for use.

A release of the pawl is achieved in a simple way if the shaft receives at its one end a lever, which can be pivoted by means of a spring-loaded button fitted in the rear window shelf.

The release operation can also be initiated by the driver if the shaft receives at its one end a lever, to the free end of which the tappet of a power-assisted control element is articulate for remote control.

In a further advantageous embodiment of the invention, the bearing arms are automatically locked when pushed into the bearing elements and, in the in-use position of the head restraint, this locking can be cancelled in each case by means of a lever which can be reached from the clearance in the protrusion for the bearing arms.

The serviceability of the mechanism is retained for a long period if the clearance in the protrusion receives a movable collar which rests against its respective bearing arm, and if each bearing arm preferably runs in the shape of an arc over its swinging region in the area in contact with the shaft. This measure also prevents an undesired draught from the boot of the motor car.

The foregoing and other objects, features, and advantages of the present invention will become more apparent from the following description when taken in connection with the accompanying drawings which show, for the purposes of illustration only, one embodiment in accordance with the present invention, and wherein.

Figure 1:
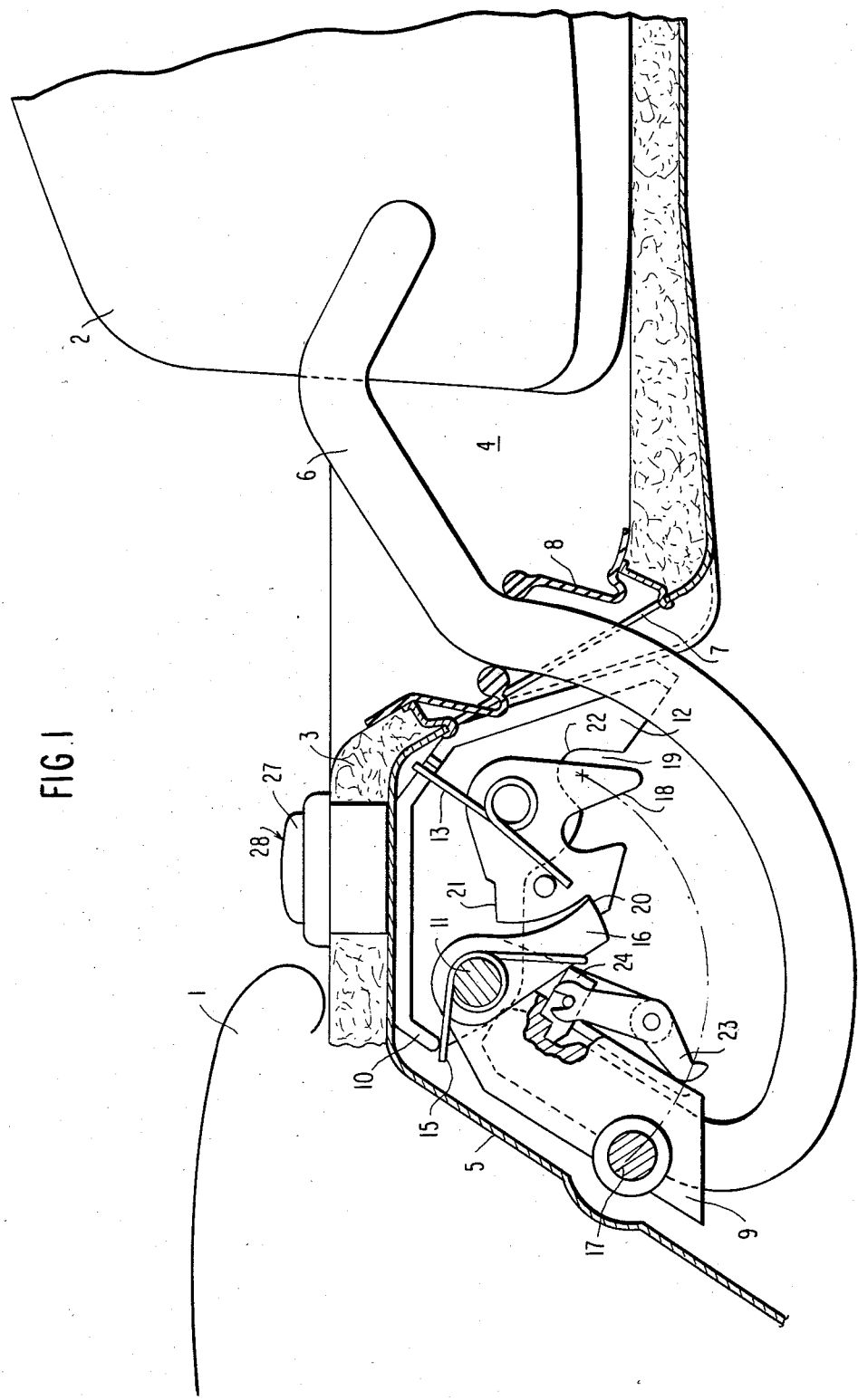
FIG. 1 shows a partially cut-away view of a head restraint according to the invention in its stowage position.

Referring now to the figures wherein like reference numerals designate like elements and, in particular to FIG. 1, a head restraint 2, belonging to a motor car rear seat 1, not shown in more detail, rests in its stowage position in a hollow 4 sunk in the rear window shelf 3, which hollow is bounded in the direction of the rear seat 1 by a protrusion 5. The head restraint 2 is fitted with bearing arms 6, which are designed in the shape of an arc in certain regions around the shaft 11 and which pass through a respective clearance 7 in the protrusion 5, which is sealed off by means of a movable collar 8, and are received by bearing elements 9. The latter are arranged to pivot, the shaft 11 mounted in a bracket 10, fixed on the underside of the protrusion 5, serving as the bearing.

The bracket 10 has a web-like middle region 12, which receives, in pivoted arrangement, a catch 14, which is loaded by a spring 13, and a pawl 16, which is likewise under the action of a spring 15.

Figure 3:
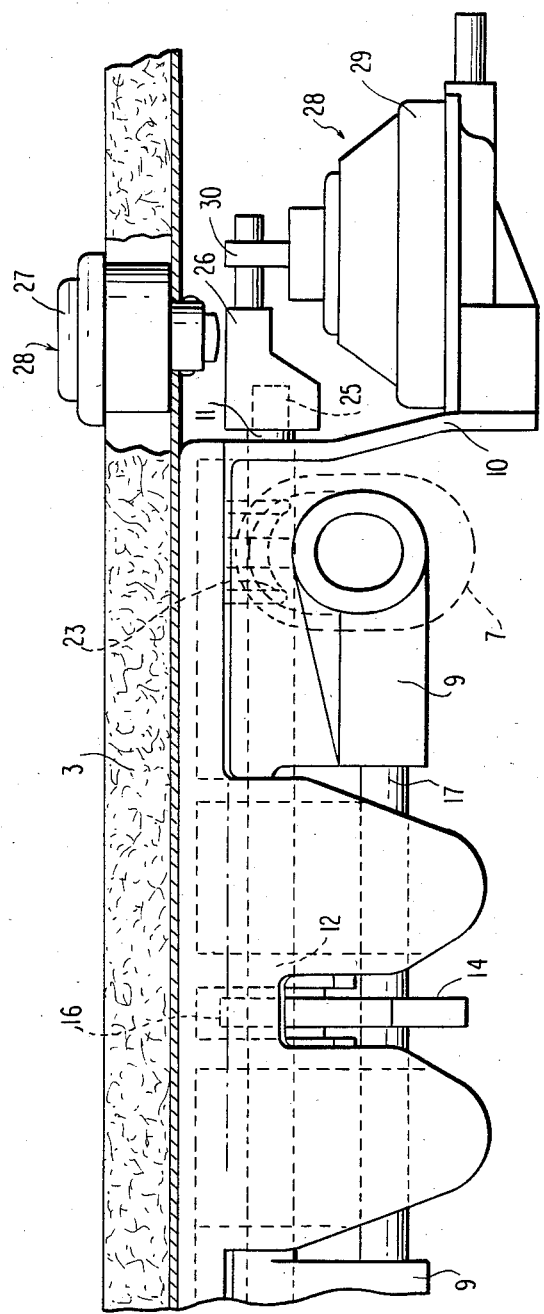
FIG. 3 shows a rear view of FIG. 2 with the head restraint removed and with a power-assisted control element.
Figure 4:
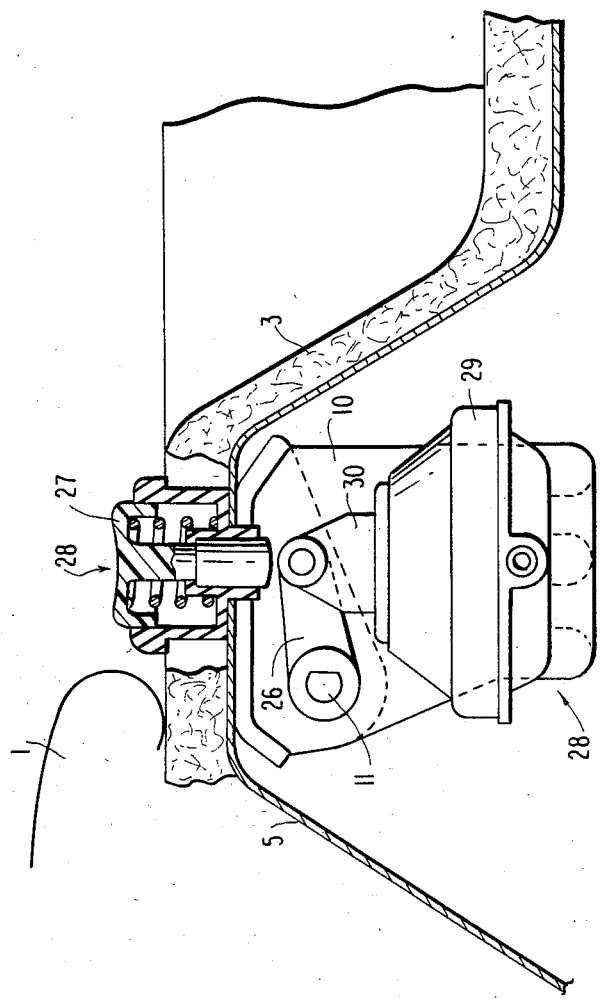
FIG. 4 shows a side view of FIG. 3, seen from the right.

As FIG. 3 shows in particular, the two bearing elements 9 are connected to each other by means of a rod 17, which, when the head restraint 2 is swung out of the stowage position according to FIG. 1, which can also be secured by a means not shown, runs at the end of the swinging operation against a stopping face 18 in an engaging recess of the catch 14 and pivots the latter anti-clockwise against the force of the spring 13.

Figure 2:
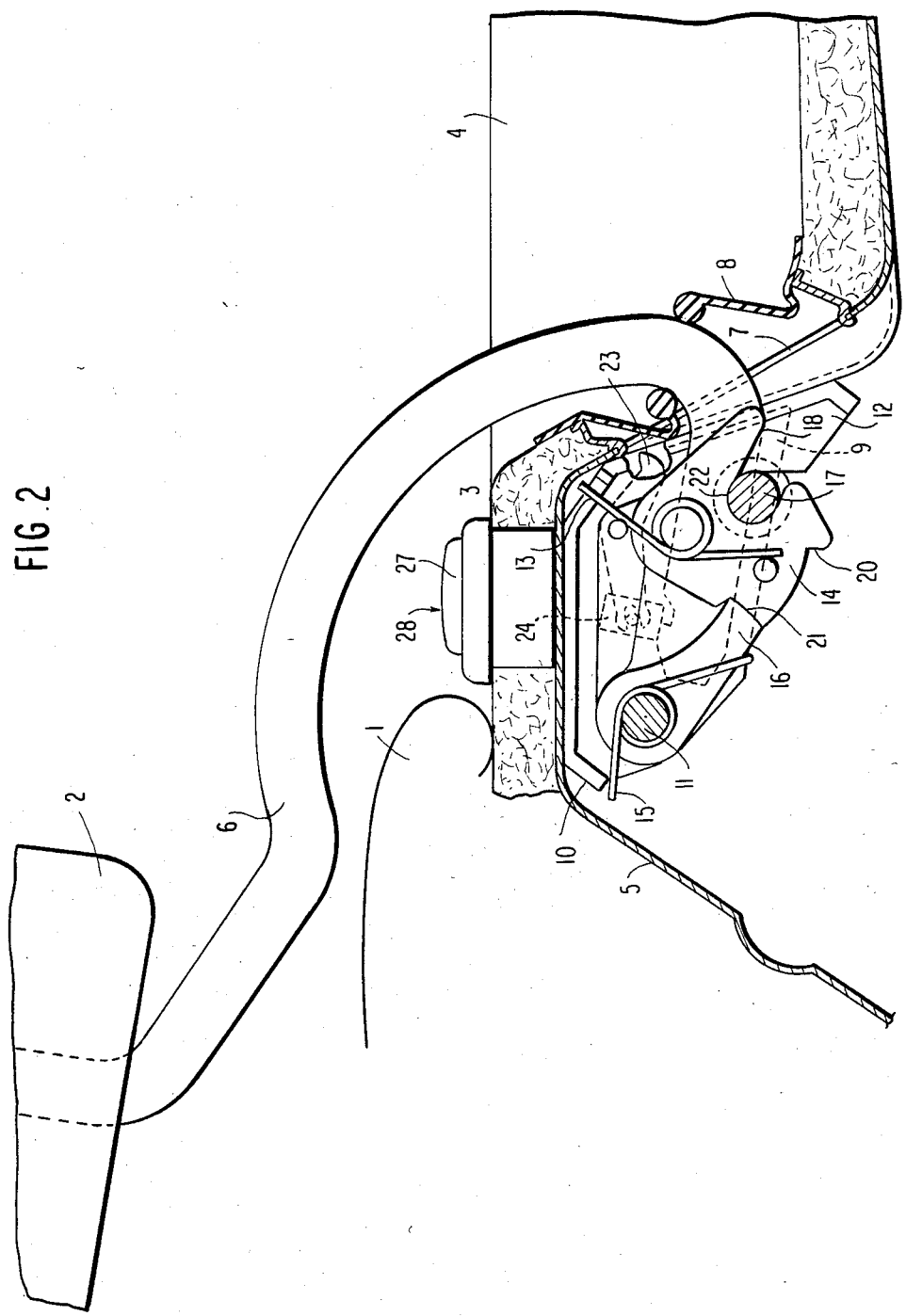
FIG. 2 shows the head restraint according to FIG. 1 in its in-use position.

At the same time, the stop 20 of the catch 14 moves away from the pawl 16 and the latter drops into an engaging shoulder 21 on the catch 14 when the head restraint 2 reaches the position for use shown in FIG. 2, in which the restraint can be pivoted relative to the bearing arms 6 to make it more comfortable. Since the rod 17 simultaneously comes into contact with the base 22 of an engaging recess 19 in the web-like middle region 12, the swinging movement of the bearing arms 6 is limited and the supporting function of the pawl 16 causes the position reached to be secured.

In this position, it is possible to remove the head restraint 2, by pressing down a lever 23 received in pivoted arrangement by the bearing element 9, for example from outside without removing the collar 8, an engaging bolt 24, under the action of a spring (not shown) and interacting with the lever 23, being raised by this. This causes the bolt to be disengaged from its respective bearing arm 6, which can then be pulled out of the bearing element 9 together with the head restraint 2.

The pawl 16 is connected to the shaft 11 so that it is torsionally rigid and its one end 25 receives a lever 26, which can be pushed down by means of a button 27 fitted in the rear window shelf 3 and acting as a remote control 28.

The remote control 28 can also be designed as a control element 29, which can be actuated by the influence with the lever 26.

The control element 29 can be triggered, for example, by means of a switch (not shown) arranged on the dashboard. If the button 27 or the tappet 30 is moved downwards, the lever 26 pivots clockwise and the pawl 16, which is connected to the same axis, pivots in the same direction, so that, from the configuration in FIG. 2, the pawl 16 is disengaged from the engaging shoulder 21 of the catch 14. The head restraint 2 can then be transferred manually or with power assistance back into the stowage position shown in FIG. 1.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A head restraint apparatus for a vehicle, the head restraint having at least one bearing arm, the head restraint being transferable from an in-use position into a stowage position in which the head restraint is received by a hollow in a rear window shelf of the vehicle, the at least one bearing arm being mounted between a backrest and the hollow on a protrusion with a downward extension in the transverse direction of the vehicle comprising a bracket projecting from the underside of the protrusion, the bracket having a web-like middle region,
   a catch received by said region,
   a shaft with a pawl mounted thereto, the pawl interacting with the catch,
   an actuating means for releasing the pawl from the catch,
   two bearing elements received by the at least one bearing arm, the shaft serving as a bearing for at least one of the two bearing elements,
   a rod means connecting the bearing elements for engaging and locking in the catch when the head restraint is transferred into the position for use.

2. A head restraint apparatus according to claim 1, wherein the shaft receives at its one end a pivotable lever and further comprising
   a spring loaded button means fitted in the rear window shelf for pivoting the lever.

3. A head restraint apparatus according to claim 1, wherein
   the shaft receives at its one end a lever, and
   a power-assisted control means articulated for remote control and having a tappet means for actuating the lever.

4. A head restraint apparatus according to claim 1, wherein the bearing arms are automatically locked when pushed into the bearing elements and further comprising
   lever means accessible from a clearance in the protrusion for the at least one bearing arm for releasing the locking of the bearing arms.

5. A head restraint apparatus according to claim 4, further comprising
   a removable collar receivable in the clearance in the protrusion and resting against at least one respective bearing arm,
   the at least one bearing arm configured in the shape of an arc between the shaft and a head restraint.

* * * * *